(12) United States Patent
Edin et al.

(10) Patent No.: US 6,361,062 B1
(45) Date of Patent: Mar. 26, 2002

(54) FACILE TRACTOR HOOK UP

(76) Inventors: Scott E. Edin, Erickson Rd., Box 633, Duquette, MN (US) 55729; Lloyd A. Fodness, 241-99$^{th}$ Ave., Apt. 101, Blaine, MN (US) 55434

( * ) Notice: Subject to any disclaimer, the term of this patent is extended or adjusted under 35 U.S.C. 154(b) by 0 days.

(21) Appl. No.: 09/393,643

(22) Filed: Sep. 10, 1999

(51) Int. Cl.$^7$ ................................................ B60F 63/00
(52) U.S. Cl. ................................... 280/416.2; 294/82.2
(58) Field of Search ......................... 280/416.2, 461.1, 280/416; 294/82.31, 82.33, 82.2, 82.17

(56) References Cited

U.S. PATENT DOCUMENTS

| | | | |
|---|---|---|---|
| 3,312,478 A | * 4/1967 | Knaapi | 172/248 |
| 3,531,140 A | * 9/1970 | De Vita et al. | 280/477 |
| 3,561,788 A | * 2/1971 | Carlson | 280/461 |
| 3,716,253 A | * 2/1973 | Gniffke et al. | 280/416.2 |
| 3,798,821 A | * 3/1974 | Bybee | 43/15 |
| 3,841,663 A | * 10/1974 | Proffit | 280/475 |
| 4,067,471 A | 1/1978 | Roatcap | 214/766 |
| 4,071,263 A | 1/1978 | Kunze | 280/508 |
| 4,157,838 A | * 6/1979 | Allwörden | 280/508 |
| 4,366,967 A | * 1/1983 | Vollmer et al. | 280/504 |
| 4,751,892 A | * 6/1988 | Sechel et al. | 114/221 R |
| 4,944,354 A | 7/1990 | Langen et al. | 172/47 |
| 4,958,848 A | 9/1990 | Nash | 280/509 |
| 5,441,117 A | * 8/1995 | Fartmann et al. | 172/272 |
| 5,497,835 A | * 3/1996 | Laubner et al. | 172/272 |
| 5,538,303 A | * 7/1996 | Dunham | 294/82.31 |
| 5,927,431 A | 7/1999 | Klein, Jr. | 182/3 |
| 6,125,945 A | * 10/2000 | Skaggs et al. | 172/439 |

* cited by examiner

Primary Examiner—Robert P. Olszewski
Assistant Examiner—Andrew J. Fischer
(74) Attorney, Agent, or Firm—Nawrocki, Rooney & Sivertson, P.A.

(57) ABSTRACT

The facile tractor hook-up of the present invention includes a frame adapted to be received on a vertically moveable three point harness of a tractor. A hitching hook having a body, a loop engaging portion, and a spring tensioned keeper pivotally secured at one end to the body, is carried by the frame. The loop engaging portion has a hook shaped tip defining a loop receiving slot. The keeper has an open position allowing access to the loop receiving slot and a closed position extending to the hook shaped tip to close the loop receiving slot. A keeper actuator for remotely actuating the spring tensioned keeper between the closed and open positions is provided. A tongue adaptor, securable to towable apparatus, is further provided and includes an elongated tongue blade having a looped end portion for receipt by the loop engaging portion of the hitching hook and capture therein by the spring tensioned pivoting keeper.

18 Claims, 5 Drawing Sheets

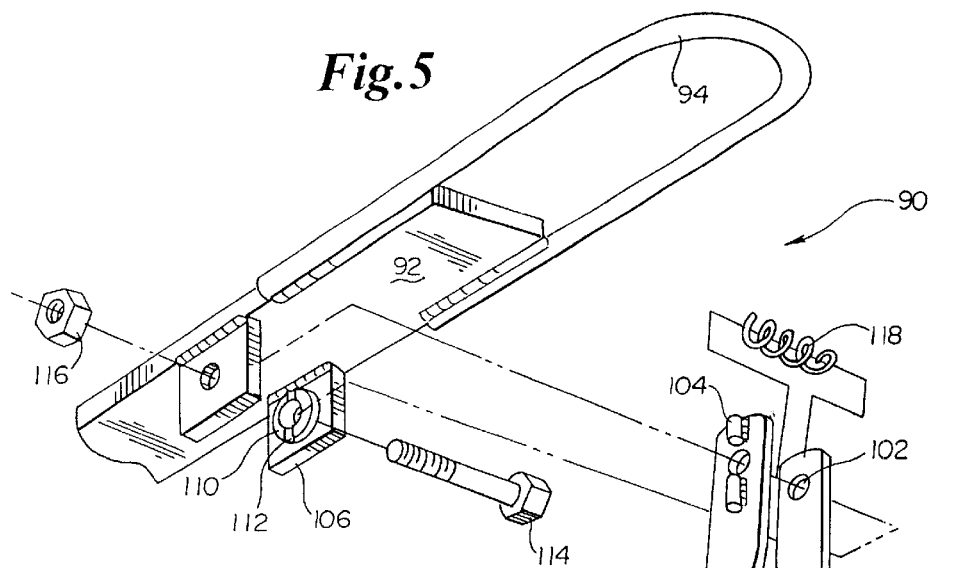
Fig.5
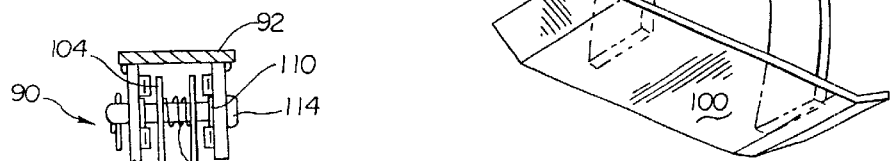
Fig.6
Fig.7
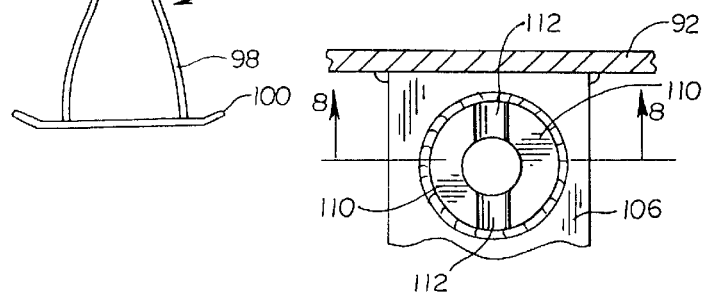
Fig.8
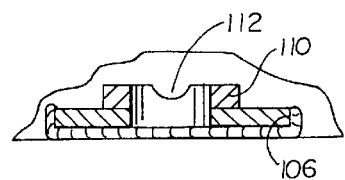

FACILE TRACTOR HOOK UP

TECHNICAL FIELD

The present invention relates to a towing assembly, and more particularly to a hitch structure mountable to a three point harness of a tractor which cooperatively engages a tongue adaptor securable to towable apparatus such as farm equipment and the like such that a tractor operator can quickly, easily and effortlessly couple and especially de-couple towable apparatus while remaining seated on the tractor.

BACKGROUND OF INVENTION

The collection of hay from the field has always been a time consuming yet necessary task for farmers. Once cut, dried, raked and baled, the hay is left for pick-up, collection, transport and ultimately storage. As the bales are typically scattered throughout a field or a number of fields, a great deal of time is generally spent in route, whether it be travelling from one bale area to another for collection, or in back and forth travelling associated with retrieval of the bales as in pick-up and loading once in a bale area.

Heretofore, a loading tractor for bale pick-up and a hauling tractor and trailer combination were essential to bring the hay in for storage. Generally, the separate tractors, one having a trailer in tow, head out together for hay bale collection. Once a bale area has been reached, the hauling tractor centrally parks itself for receipt of the bales loaded by the loading tractor. The loading tractor, typically equipped with a bale skewer attachment or equivalent structure for running through the bales, retrieves the bales and transfers them to the trailer of the hauling tractor and trailer combination.

The hauling tractor's sole function is to follow the loading tractor Pied Piper like, carrying the collected bales from one bale area to another. Once in a bale area, the hauling tractor, and the tractor operator, sit idle. As one might suspect, a great deal of idle time is inherent in such operation. Not only is there a direct "cost" associated with the idle time for both the operator and equipment, one ultimately reflected in the "price," there exists lost opportunity costs, namely the work otherwise completed but for the availability of the operator and equipment, which are greatly underutilized in the heretofore known approaches to bringing in the hay from the fields.

SUMMARY OF THE INVENTION

The present invention provides a supremely efficient versatile approach to hay bale collection and transport, namely one that eliminates the need for separate tractors for bale pick-up and collected bale hauling. The facile tractor hook-up of the present invention includes a frame adapted to be received on a vertically moveable three point harness of a tractor. A hitching hook having a body, a loop engaging portion, and a spring tensioned keeper pivotally secured at one end to the body, is carried by the frame. The loop engaging portion has a hook shaped tip defining a loop receiving slot. The keeper has an open position allowing access to the loop receiving slot and a closed position extending to the hook shaped tip to close the loop receiving slot. A keeper actuator for remotely actuating the spring tensioned pivoting keeper between the closed and the open positions is provided. A tongue adaptor, securable to towable apparatus, is further provided and includes an elongated tongue blade having a looped end portion for receipt by the loop engaging portion of the hitching hook, and capture therein by the spring tensioned pivoting keeper. More specific features and advantages will become apparent with reference to the DETAILED DESCRIPTION OF THE INVENTION, appended claims, and the accompanying drawing figures.

BRIEF DESCRIPTION OF THE DRAWINGS

FIG. 5 is a perspective exploded underside view of the tongue adaptor.

FIG. 6 is an end view of the tongue adaptor illustrating the relationship between the tongue blade and the stand.

FIG. 7 is a side view of an ear of the tongue blade.

FIG. 8 is a sectional view taken about line 8—8 of FIG. 7 particularly illustrating the detents.

DETAILED DESCRIPTION OF THE DRAWINGS

Figure 1:
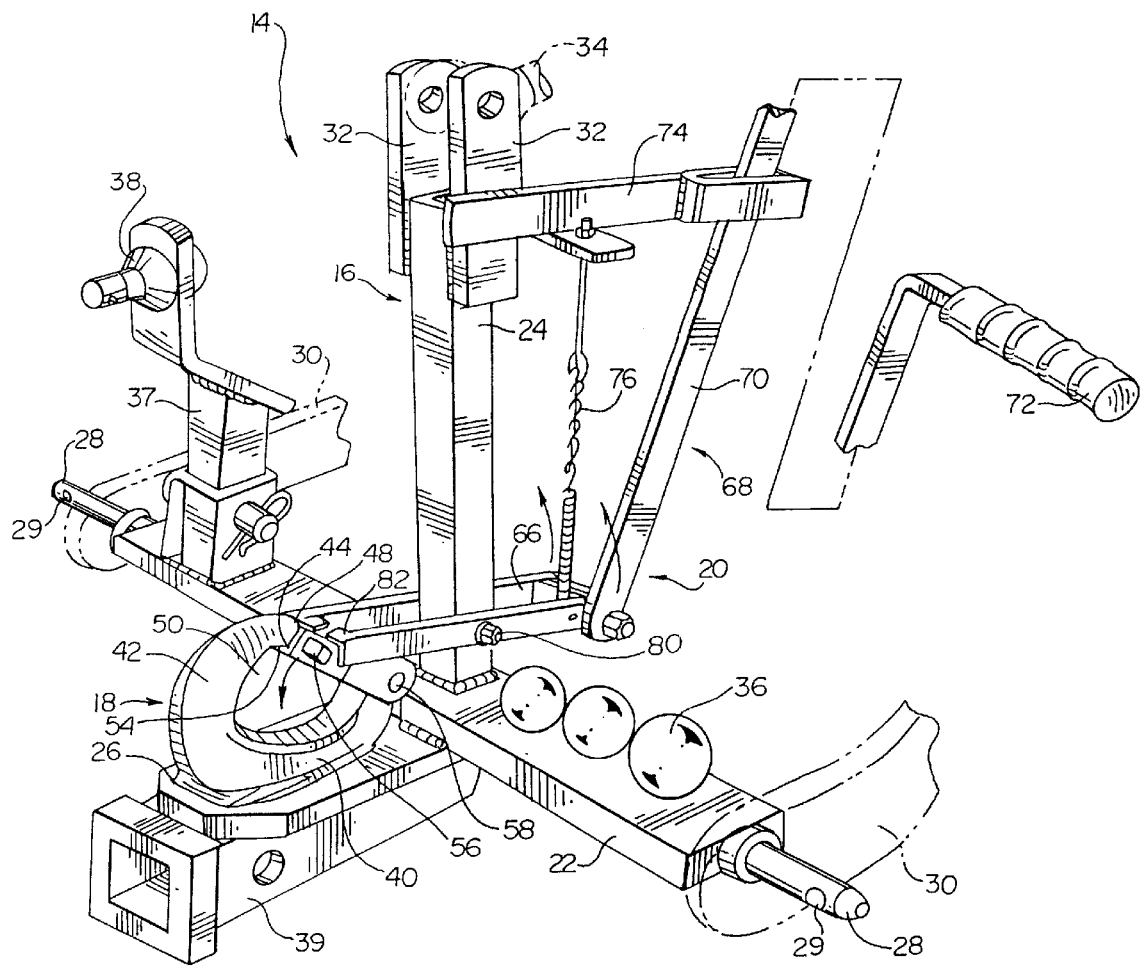
FIG. 1 is an perspective end view of the hitch structure of the present invention.

Referring to FIG. 1, the hitch structure 14 of the towing assembly generally includes a frame 16, a hitching hook 18 and a keeper actuator 20. The frame 16 of the hitch structure 14 is preferably, but not necessarily, adapted to be received on a vertically moveable three point or other style harness typical of farm tractors and the like.

Preferably the frame 16 has joined horizontal 22 and vertical 24 support members and a hitching hook platform or base 26. The hitching hook platform 26 perpendicularly extends from the horizontal support member 22, in the vicinity of the vertical support member 24. The hook platform 26 and the vertical frame support member 24 are preferably, but not necessarily, co-planar.

The horizontal support member 22 has opposing ends preferably equipped with outwardly projecting apertured shafts or rods 28 which cooperatively engage the rearwardly extending lower arms or linkages 30 of the three point tractor harness. The horizontal support member 22 is preferably secured to the lower linkages 30 of the three point harness using known styles of retaining clips (e.g., cotter pin, etc., not shown) inserted in the apertures 29 of the opposing shafts 28.

The vertical support member 24 is preferably centrally positioned between the opposing ends of the horizontal support member 22, and extends perpendicularly upward therefrom. At its free end, the vertical support member 24 is equipped with opposing apertured flanges or bars 32 which are spaced apart to receive the top center arm or linkage 34 of the three point tractor harness. Other known adaptations of the horizontal and vertical support members, and the frame generally, for mounting to the three point harness are equally embraced and contemplated for the hitch structure of the subject invention.

Figure 2:
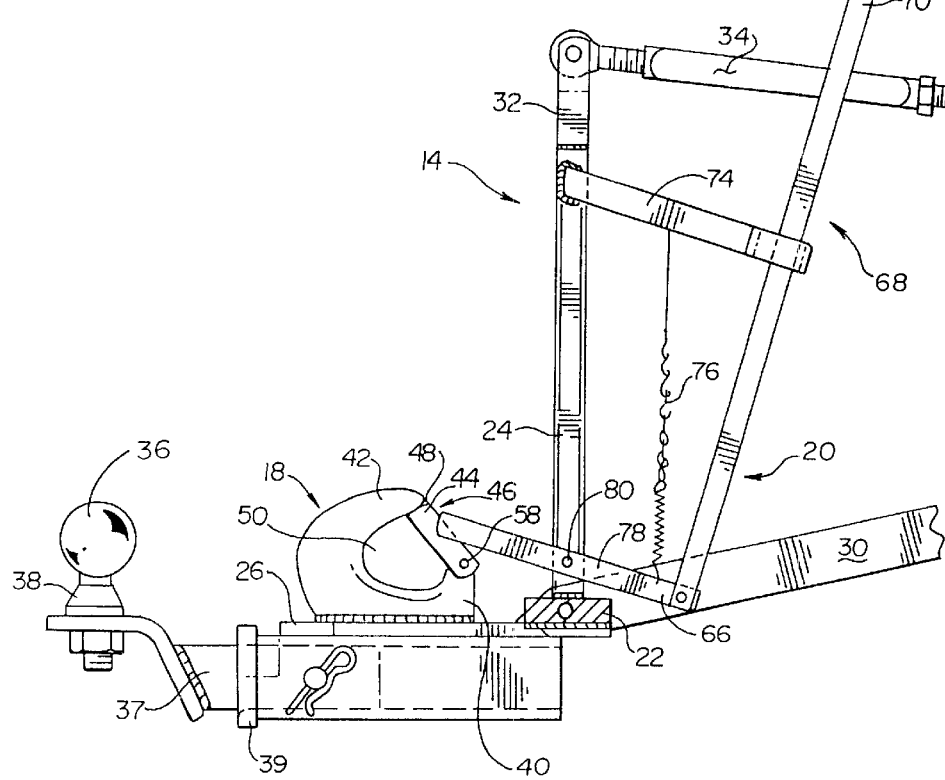
FIG. 2 is a side view of the hitch structure of the subject invention convertibly transformed for hitch ball towing.

Ball hitch components (e.g., hitch balls 36, a draw-bar 37 equipped with a hitch ball stem 38, a draw bar socket 39, etc.) are preferably but not necessarily carried by the frame 16 of the hitch structure 14 (e.g., on the horizontal frame support member 22) so as to make the conversion from hook hitching to ball hitching possible. Such conversion of the hook hitch of FIG. 1 is shown in FIG. 2.

Again referring to FIG. 1, the hitching hook 18 of the hitch structure 14 has a body 40, a loop engaging portion 42 and a spring loaded or tensioned keeper 44 pivotally secured at one end to the hook body 40. The hitching hook 18 is generally attached (i.e., welded) to the hitching hook platform 26, for alignment therewith, throughout a portion of its body 40, with the hook 18 generally configured such that its mouth 46 is upwardly directed. The loop engaging portion of the hook 42 has a hook shaped tip 48 defining a loop receiving slot 50 which is "guarded" by the tensioned keeper 44 (i.e., the keeper 44 has an open position which allows access to the loop receiving slot 50 and a closed position extending to the hook shaped tip 48 to close the loop receiving slot 50).

Figure 3:
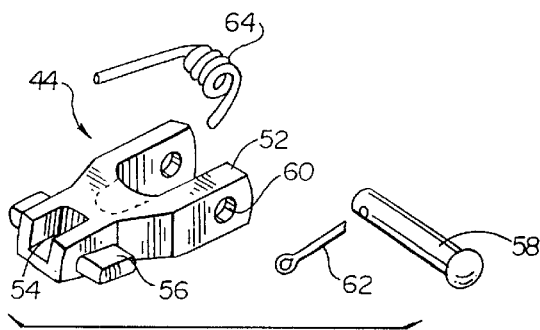
FIG. 3 is a perspective view of the keeper of the hitching hook.

Referring now to FIG. 3, the keeper 44 preferably has spaced apart arms 52 for receiving a portion of the hook body 40 therein at one end, and a groove 54 for receiving the hook tip 48 at the other end. The groove 54 is preferably sloped or otherwise profiled to accommodate the geometry of the hook shaped tip 48 of the loop engaging portion 42 of the hitching hook 18. The profiled groove 54 is preferably flanked by flanges or tabs 56 which, as will be later discussed, assist in remotely moving the keeper between closed and open positions.

The keeper 44 is pivotally mounted to the hook body 40 by a pin 58 extending through apertures 60 in the keeper arms 52 and an aperture in the portion of the hook body received therein, with the mounting pin 58 preferably secured using a cotter pin 62 or the like. A torsion spring 64 is carried by the mounting pin 58 between the keeper arms 52 for maintaining the keeper in a closed position.

Referring back to FIG. 1, the keeper actuator 20 includes a lever 66 pivotally mounted to the vertical support member 24 of the frame 16 for engagement with the tensioned keeper 44, and a handle assembly 68 for pivoting the lever 66 so as to move the keeper from a closed to an open position as when de-coupling a towed apparatus. The handle assembly 68 includes a handle arm 70 connected at one end to the lever 66 and terminating at the other end in a handle grip 72, and a handle guide 74 for supporting the handle arm 70. The handle arm 70 is generally dimensioned and positioned (e.g., at an angle with respect to the vertical frame support member 24 as shown in FIG. 2) so as to permit handle grip 72 access and manipulation from a seated position in a tractor outfitted with the hitch structure of the subject invention. The handle guide 74 is connected to and extends from the upper portion of the vertical frame support member 24, in a direction opposite the hook platform 26. A spring 76 or other tensioning device links the lever 66, near the handle arm connection, to the handle guide 74 so as to bias the opposing end of the lever against the tensioned keeper 44, thereby taking up any "slack" or play in the keeper actuator 20.

Figure 4:
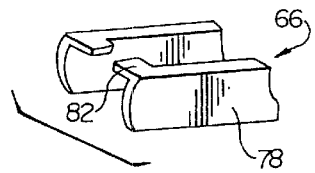
FIG. 4 is a sectional perspective end view of the open end of the lever of the hitch structure.

The lever 66 of the keeper actuator 20 preferably has opposing spaced apart arms 78 connected at one end to thereby define open and closed ends for the lever. The vertical frame support 24 is received between the arms of the lever 78, with the lever 66 centrally carried thereby on a bolt 80 about which the lever 66 pivots. The closed end of the lever 66 is biased upwardly toward the handle guide 74 by the tensioning spring 76, and is capable of manipulated pivoting by the handle assembly 68. The open end of the lever, as detailed in FIG. 4, has opposing inwardly directed flanges or tabs 82 for cooperative engagement with the flanges 56 of the tensioned keeper 44. The upward motion of the handle arm 70—as when pulling the handle grip 74 upward from a seated position in the tractor—causes pivoting of the lever 66, namely the closed end portion upward and the open or flanged end portion downward, thereby moving the tensioned keeper 44 guarding the loop receiving slot 50 from a closed to an open position.

Referring now to FIGS. 5 & 6, the tongue adaptor 90 generally includes an elongated tongue blade 92 having a looped end portion 94 and a tensioningly pivotable stand 96 secured to the tongue blade 92 for elevating the looped end portion 94 off the ground. The tongue adaptor 90 is securable to towable apparatus using known methods in combination with the tongue blade 92, such as chain rigging and the like. The looped end portion 94 of the tongue adaptor 90 is curved in a manner so as to accommodate receipt of the loop engaging portion 42 of the hitching hook 18. With this relationship, the looped end portion 94 of the tongue blade 92 is easily received by the loop engaging portion 42 of the hitching hook 18, and is readily captured therein by the tensioned keeper 44. Suitable configurations for the loop include the "D" shape illustrated, semi-circular, ring shaped or even angular geometries such as triangular or rectangular.

The tensioningly pivotable stand 96 preferably includes a pair of legs 98 having a wishbone configuration. The legs are joined at one end (i.e., their wide end), by a ground engaging platform or foot 100. Aligned bolt receiving apertures 102 are positioned on each of the legs 98 at their narrow end (i.e., the end opposite the foot 100), with detent lugs 104 vertically aligned thereabout on the exterior leg surfaces (i.e., positioned at six and twelve o'clock).

The collapsible stand 96 is carried by the tongue blade 92 on opposing flanges or ears 106 that depend downwardly from the lateral sides of the tongue blade 92. The ears 106 have aligned apertures 108 for registration with the aligned bolt receiving apertures 102 of the legs 98 which are received therebetween. As best seen in FIGS. 7 & 8, raised ring segments 110, separated by vertically aligned detents 112, are positioned on the interior ear surfaces about the circumference of the apertures 108 therethrough. An attachment bolt 114, or equally suitable fastener about which the stand is pivotable, is secured through the registered bolt receiving apertures of the ears and legs, as for instance with a nut 116 as shown in FIG. 6. A compression spring 118 is carried by the attachment bolt 114 (i.e., pivot pin), between the legs 98 of the stand 96, for urging the upper portions of the legs apart such that the detent lugs 104 of the legs 98 are restingly received in the detents 112 such that the collapsible stand 96 is substantially perpendicular with reference to the tongue blade 92.

Figure 9:
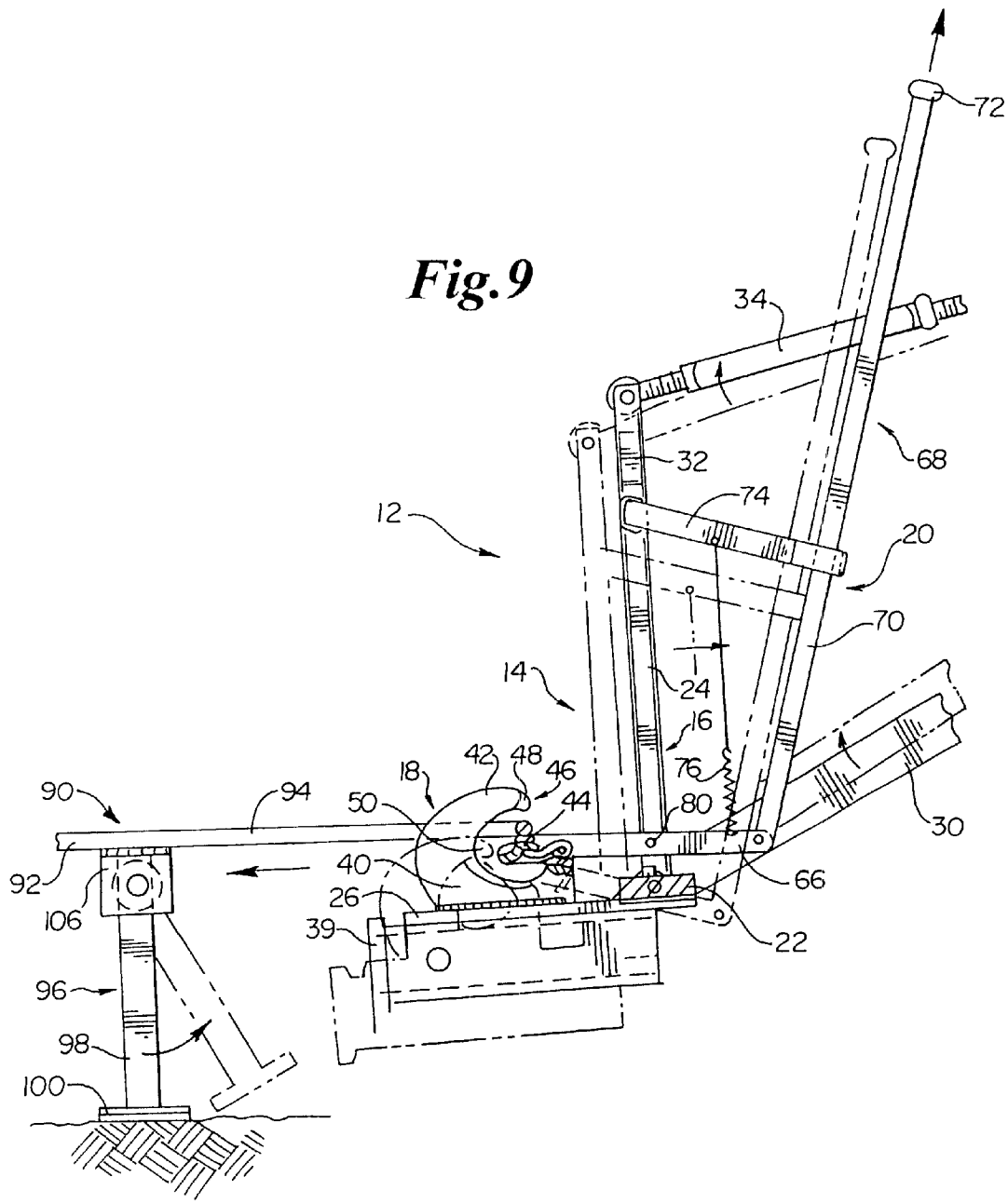
FIG. 9 is a side view of the towing assembly depicting the hooking motion of the hitch structure upon engagement with the tongue adaptor.

Referring now to FIG. 9, the towing assembly 12 of the subject invention is shown at two different times during the hitching or coupling process, namely with the hitch structure 14 having struck the tongue adaptor 90 in anticipation of receiving the loop end portion 94 in the loop receiving slot 50 thereof (i.e., phantom lines), and at a subsequent time wherein the hitch structure 14 has been raised and moved forward so that the tensioned keeper 44 has assumed an open position due to engagement of the open end of the lever 66 with the looped end portion 94 of the tongue blade 92. In this sequence, the vertical manipulation of the hitch structure 14 via the three point harness is essential to the positioning the hitching hook 18 of the hitch structure 14 for hooking the looped end portion 94 of the tongue blade 92. As shown in phantom lines, upon a significant impact to the tongue blade 92 or the stand 96 itself, as the case may be, the tensioningly pivotable stand will collapse so as to prevent breakage.

Figure 10:
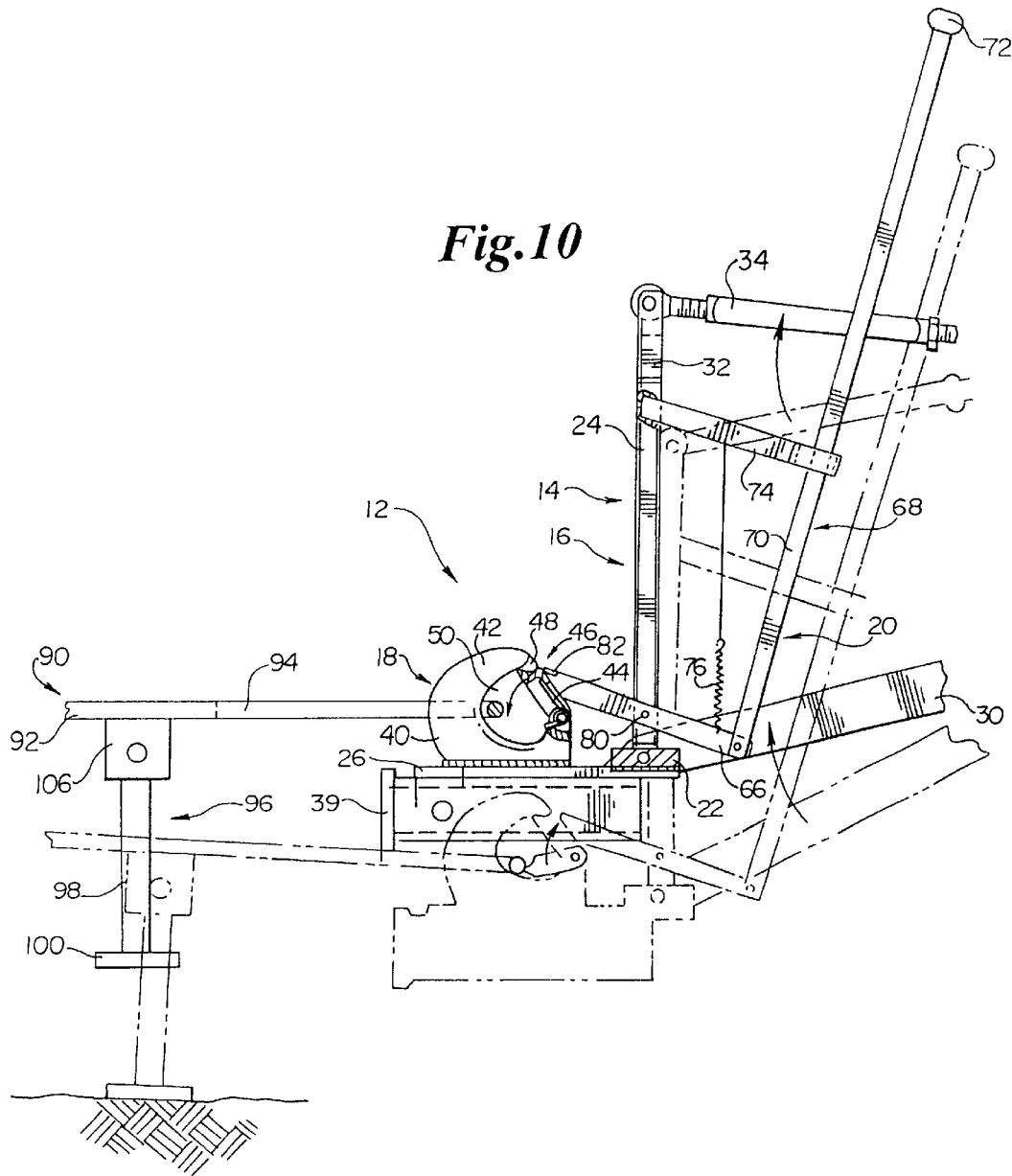
FIG. 10 is a side view of the towing assembly depicting the hooking, capture and elevation of the tongue adaptor structure by the hitch structure.

Referring now to FIG. 10, the towing assembly of FIG. 9 is show at two later times, namely with the looped end portion 94 of the tongue blade 92 received in the loop engaging portion 42 of the hitching hook 18 and captured therein by the tensioned keeper 44 which has pivoted from an open to closed position (i.e., phantom lines), and at a subsequent time wherein the hitch structure 14, having captured the tongue adaptor 90, is further elevated, thereby elevating the towable apparatus for towed transport.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A towing assembly comprising:
   (a) a frame adapted to be received on a vertically moveable harness of a tractor;
   (b) a hitching hook carried by said frame, said hitching hook having a body, a loop engaging portion, and a spring tensioned keeper pivotally secured at one end to an end of said body, said loop engaging portion having a hook shaped tip defining a loop receiving slot, said spring tensioned keeper having an open position allowing access to said loop receiving slot and a closed position extending to said hook shaped tip to close said loop receiving slot;
   (c) a keeper actuator for remotely actuating said spring tensioned keeper between said closed and said open positions; and
   (d) a tongue adaptor securable to towable apparatus, said tongue adaptor comprising an elongated tongue blade having a looped end portion for insertion into said loop engaging portion of said hitching hook and capture therein by said spring tensioned pivoting keeper, secure engagement of said looped end portion of said elongated tongue blade with said loop engaging portion of said hitching hook defining a dynamic condition for said towing assembly.

2. The towing assembly of claim 1 wherein said frame has joined vertical and horizontal support members.

3. The towing assembly of claim 2 wherein said keeper actuator comprises a lever pivotably mounted to said vertical support member of said frame for engagement with said spring tensioned keeper, and a handle assembly for pivoting said lever so as to move said spring tensioned keeper between said closed and said open positions.

4. The towing assembly of claim 3 wherein said handle assembly includes a handle arm connected at one end to said lever and terminates at the other end in a handle grip.

5. The towing assembly of claim 4 wherein said handle assembly further includes a handle guide for supporting said handle arm, said handle guide connected to and extending from said vertical support member of said frame.

6. A towing assembly comprising:
   (a) a frame adapted to be received on a vertically moveable harness of a tractor, said frame having joined vertical and horizontal support members;
   (b) a hitching hook carried by said frame, said hitching hook having a body, a loop engaging portion, and a spring tensioned keeper pivotally secured at one end to said body, said loop engaging portion having a hook shaped tip defining a loop receiving slot, said spring tensioned keeper having an open position allowing access to said loop receiving slot and a closed position extending to said hook shaped tip to close said loop receiving slot;
   (c) a keeper actuator for remotely pivoting said spring tensioned keeper between said closed and said open positions, said keeper actuator comprising a lever pivotably mounted to said vertical support member of said frame for engagement with said spring tensioned keeper, a handle assembly for pivoting said lever so as to move said spring tensioned keeper between said closed and said open positions, and wherein said keeper actuator further includes tensioning means linking said lever to said handle guide, said handle assembly including a handle arm connected at one end to said lever and terminating at the other end in a handle grip, and a handle guide for supporting said handle arm, said handle guide connected to and extending from said vertical support member of said frame; and,
   (d) a tongue adaptor securable to towable apparatus, said tongue adaptor comprising an elongated tongue blade having a looped end portion for insertion into said loop engaging portion of said hitching hook and capture therein by said spring tensioned pivoting keeper, secure engagement of said looped end portion of said elongated tongue blade with said loop engaging portion of said hitching hook defining a dynamic condition for said towing assembly.

7. The towing assembly of claim 6 wherein said tongue adaptor further includes a stand perpendicularly extending from said elongated tongue blade.

8. The towing assembly of claim 7 wherein said stand is collapsible.

9. The towing assembly of claim 7 wherein said stand is tensioningly pivotable with respect to said elongated tongue blade.

10. The towing assembly of claim 9 wherein said tongue adaptor further includes means for pivotably mounting said stand to said tongue blade.

11. A hitch structure comprising:
    (a) a frame adapted to be received on a vertically moveable hitch of a towing vehicle said frame having a free end comprising a draw bar socket;
    (b) a hitching hook carried by said draw bar socket for coupling to a towable apparatus, said hitching hook having a body, a loop engaging portion, a mouth, and a spring tensioned keeper pivotally secured at one end directly to said body so as to traverse said mouth and capture a loop therein, said spring tensioned keeper having a free end pivotably positionable away from said loop engaging portion of said hitching hook so as to selectively free a loop captured therein; and
    (c) means for pivoting said spring tensioned keeper from a seated position on the towing vehicle, said means being supported by a portion of said frame.

12. A hitch attachment comprising:
    (a) a frame adapted to be received on a vertically moveable harness of a tractor, said frame having joined vertical and horizontal support members and a draw bar socket longitudinally extending from said horizontal support member, said vertical support member upwardly extending from said horizontal support member;

(b) a hitching hook supported by said draw bar socket, said hitching hook having a body, a loop engaging portion, and a spring tensioned keeper pivotally secured at one end to said body, said loop engaging portion having a hook shaped tip defining a loop receiving slot, said spring tensioned keeper having an open position allowing access to said loop receiving slot and a closed position extending to said hook shaped tip to close said loop receiving slot;

(c) a keeper actuator for selectively disabling said spring tensioned keeper, said keeper actuator comprising a lever pivotably mounted to said vertical support member of said frame for engagement with said spring tensioned keeper, and, means for operatively engaging said lever from a seated position on the towing vehicle.

13. The towing assembly of claim 1 wherein said frame is further adapted to be convertible from hook hitch towing to ball hitch towing.

14. The towing assembly of claim 13 further comprising a draw bar having a hitch ball stem for receipt of variably sized hitch balls, said draw bar stowable on said frame for conversion from hook hitch towing to ball hitch towing.

15. The towing assembly of claim 14 further comprising variably sized hitch balls adapted to be receivable on said hitch ball stem, said variably sized hitch balls being stowable on said frame.

16. The towing assembly of claim 15 wherein said frame includes a draw bar socket for receipt of said draw bar.

17. A hitch structure comprising;

(a) a frame adapted to be received on a vertically moveable hitch of a towing vehicle, said frame having a base, a vertical support member extending upwardly from said base, and a hitching hook platform extending from said base so as to define a free end for said frame;

(b) a hitching hook supported by said hitching hook platform, said hitching hook having a body, a loop engaging portion, and a spring tensioned keeper pivotally secured at one end to said body, said loop engaging portion having a hook shaped tip defining a loop receiving slot, said spring tensioned keeper having an open position allowing access to said loop receiving slot and a closed position extending to said hook shaped tip to close said loop receiving slot; and, (c) means for selectively pivoting said spring tensioned keeper from a seated position on the towing vehicle, said means being supported by a portion of said frame.

18. The hitch attachment of claim 17 wherein said hitching hook platform is adapted to support a draw bar having a hitch ball stem for receipt of variable sized hitch balls.

* * * * *